Aug. 12, 1958     E. ZIMMERMANN ET AL     2,847,122
MEASURING DEVICE FOR THE MECHANICAL AUTOMATIC EVALUATION
OF THE MEAN VALUES OF DIMENSIONS OF HOLLOW BODIES
Filed Feb. 9, 1954     2 Sheets-Sheet 1

INVENTORS
EHRENFRIED ZIMMERMANN
GUSTAV BECKER
By
ATTORNEY

Aug. 12, 1958  E. ZIMMERMANN ET AL  2,847,122
MEASURING DEVICE FOR THE MECHANICAL AUTOMATIC EVALUATION
OF THE MEAN VALUES OF DIMENSIONS OF HOLLOW BODIES
Filed Feb. 9, 1954  2 Sheets-Sheet 2
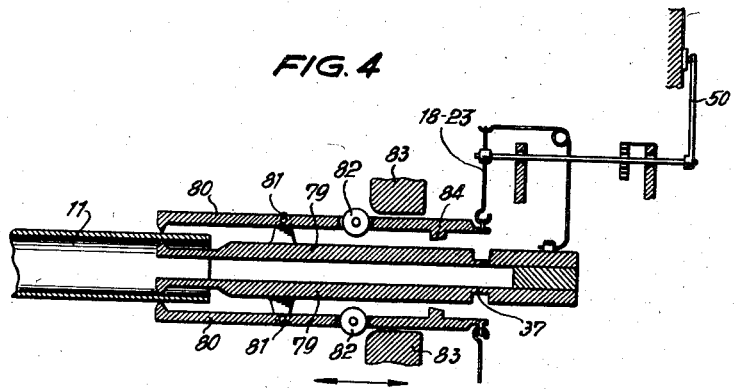
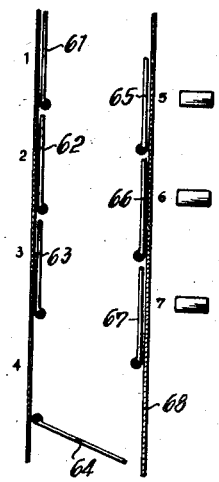
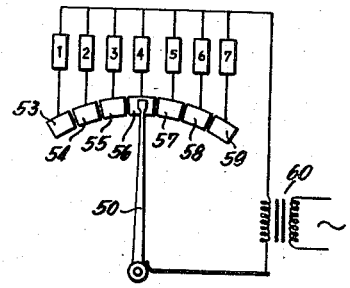
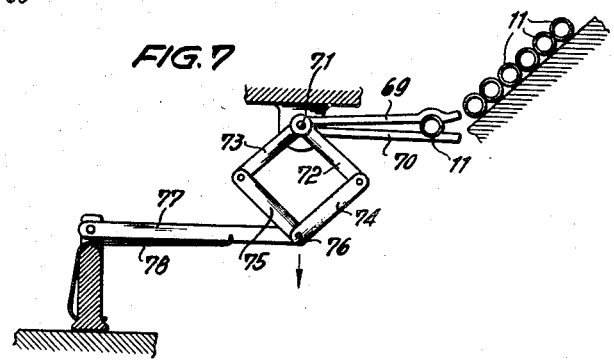
INVENTORS
EHRENFRIED ZIMMERMANN
GUSTAV BECKER
ATTORNEY

United States Patent Office 2,847,122
Patented Aug. 12, 1958

2,847,122

MEASURING DEVICE FOR THE MECHANICAL AUTOMATIC EVALUATION OF THE MEAN VALUES OF THE DIMENSIONS OF HOLLOW BODIES

Ehrenfried Zimmermann, Bunde-Sudlengern, and Gustav Becker, Main-Gonzenheim, Germany, assignors to Bunder-Glas G. m. b. H., Bunde, Germany, a German company Application February 9, 1954, Serial No. 409,202

Claims priority, application Germany February 13, 1953

14 Claims. (Cl. 209—88)

In the manufacture of hollow bodies, for example in the glass industry, the problem arises of determining the mean dimensions of the hollow body. It is particularly important in the glass working industry to know whether the hollow glass, delivered for working-up, lies within a given tolerance which permits an exact treatment. It is particularly important to know the mean inner or outer diameter or in addition the difference between them, which gives the wall thickness.

It was hitherto customary to calibrate with the assistance of fixed gauges, either by hand or mechanically, the inner diameter. The customary conical rods, spheres or the like were gauges used for this purpose. These measuring processes have however the disadvantage that because of melted edges there may be a thickening of the hollow body, which gives a wholly false picture of the important mean dimensions. Likewise sources of error arise when the glass is not wholly round.

It is an object of the invention to reduce the disadvantages and the sources of errors of the known devices or to avoid them completely and to reduce thereby so far as possible the time required for the measurements.

According to the invention there is provided a measuring device for the dimensions appertaining to hollow bodies comprising a polygonal frame, a plurality of feelers, means for bringing said feelers automatically into measuring relationship with the bore of the hollow body, radial links connecting each feeler to a junction point of the polgonal frame whereby the peripheral length of the polgonal frame can be altered, an indicator member and an operative connection between said indicator member and the polygonal frame.

The invention is illustrated with reference to a few embodiments which are depicted in the drawings wherein:

Figure 4 is a cross section through a measuring device for estimating the mean value of the wall thickness of the hollow bodies, Figure 5 is a schematic view of the contact arrangement.

Figure 6 is a schematic view of the clack valve sorting device, and

Figure 7 is the centralizing gripping member.

Figure 1:
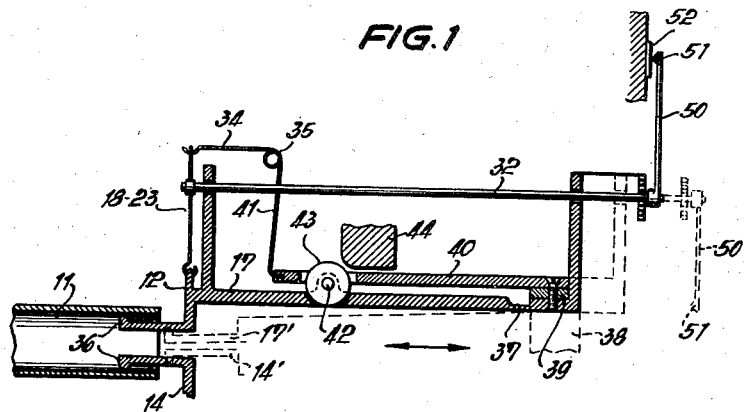
Figure 1 is a section through a measuring device for determining the mean inner diameter.
Figure 2:
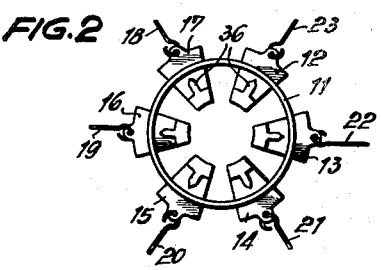
Figure 2 is a front view of the feeler arms of the device.

In Figure 1, 11 is a hollow body the inner diameter of which is to be determined. This takes place in the indicated example by a number of feeler arms 12 to 17 contacting radial traction arms 18 to 23. The outer ends of the radial arms 18 to 23 are held together by a polygonal frame 25 to 29 which is closed by two tension belts or cords 30, 31 adapted to be inversely wound up on an indicator shaft 32. For joining the arms and the parts of the polygonal frame there are used small plates 33 to which the radial arms and the peripheral links of the polygon are connected. In the outer radial direction the plates 33 engage the arms 34 of springs 35, thus tensioning the polygonal frame and pressing the feeler fingers 36 of the feeler arms 12 to 17 against the inner wall of the hollow body 11.

These arms 12 to 17 are so weakened at the location 37 that at this point a resilient link or hinge is formed. Their inner ends can be closed by a ring 38 fastened to them either directly through a connecting piece or an intermediate ring 39 to which they are separately secured. A tube 40, which may be composed of further arms parallel to the feeler arms 12 to 17, forms with these feeler arms a structural unit. This tube 40 serves as an anchor for the ends 41 of the springs 35. The anchoring takes place so that each feeler assembly, e. g. 18, 34, 35, 41, is oscillatable in the circumferential direction without giving rise to any noticeable additional torsional force liable to impair the measurement results. On each of the arms 12 to 17 at a suitable intermediate point 42 a roller 43 is mounted which projects outwardly through the tube 40. This roller cooperates with a fixed face 44. If the feeler device is moved to the right in an axial direction by a lever device, not illustrated, then the roller 43 runs on the fixed face 44 and is, in the illustration, pressed downwardly. Accordingly the upper arm 17 is pressed downwardly somewhat and the opposite feeler, for example 14, is pressed upwardly through a corresponding roller, all feelers respectively being centrally pressed together so that they are released from the inner wall of the tube 11 and come approximately into the positions 17' and 14' indicated by dotted lines.

On one of the arms, for example 17, is mounted the indicator shaft 32 on which are wound up, on the one hand, the two tension member 30, 31 and on the other hand the tension members 46, 47 of the springs 48, 49. The latter spring tends by the unrolling of its tension members 46, 47 to wind up the tension member 30, 31 of the polygonal frame. At the end of the indicator shaft 32 is a contact indicator 50 the contact 51 of which cooperates with a fixed counter-contact 52. In place of a single contact 52 there may be provided a whole series of segments, for example elements 53 to 59 (see Figure 5), which lie on a circular path and can be engaged by the contact 51. Each of these contacts corresponds to a certain mean inner diameter and is associated with one of the relays 1 to 7, which are fed by a source of direct or alternating current 60. Each of these relays 1 to 7 actuates a clack valve 61 to 67 which are, for example, located in a casing or housing 68. If the hollow body is thrown from above into this casing then, according to which contact is touched and which clack valve is actuated, it is intercepted by the armature of such valve, laterally deflected and introduced in a manner not illustrated into a collecting device. In order to prevent mutual obstruction by clack valves when two contact segments are touched at the same time it is arranged that neighboring contacts are never associated with clack valves which can mutually obstruct.

In order that the hollow body may always be presented exactly centrally to the measuring device, it is held in the measuring position by means of a gripping device illustrated schematically in Figure 7. The gripping device consists of two gripper arms 69, 70 mounted at 71 and each connected with a lever arm 72, 73 respectively, forming parts of a quadrilateral hinge which is completed by the hinge arms 74 and 75. At the hinge point 76, which lies directly below the pivotal point 71 of the gripper arms 69 and 70, a lever arm 77 is attached which is controlled by a spring 78 tending, through the quadrilateral hinge 72—75, to hold the gripper arms 69, 70 always closed.

If the arm 77 is moved downwardly, either by hand or mechanically, in a manner not illustrated, then the gripper device 69, 70 opens, takes up a hollow body, for example 11, and closes around the hollow body after release and holds it in the position shown in Figure 1 centrally with respect to the feeler devices 12 to 17. At this instant the feeler device is still in the positions 14', 17' shown in dotted lines. If the feeler mechanism is now moved toward the left through the manually or mechanically actuated lever device, then the feeler arms 12 to 17 move to the position shown in full lines in Figure 1. The spring 35 draws the feeler fingers 36 of all the feeler arms 12 to 17 solidly against the inner wall of the hollow body 11 and accordingly determines the length of the polygonal frame 25 to 29, 30, 31. Since this length is determined through the rolled up condition of the tension means 30, 31, which in turn move the indicator shaft 32, the indicator 50 thus takes up a determined angular position. In the last portion of the movement of the feeler arm, directed axially towards the left, the indicator 50 with its contact 51 registers with the contact arc 53 to 59 and at the termination of the movement, in which the angular position of the indicator is not further altered, makes contact with one of the segments 53 to 59 and accordingly actuates one of the relays, for example relay 4 as shown in Figure 5. This relay is associated with the clack valve 64 which now drops. If now, in a manner not illustrated, the hollow body 11 is again released from the gripper arms 69, 70 and is led to the casing 68, it is then intercepted by the armature of valve 64 and deflected from there to a collector through an associated exit path, not illustrated, corresponding in this particular instance to a normal mean diameter. When the classification is finished the feeler returns again to its initial position, where it is depressed by means of roller 43, as previously mentioned, and thereby is freely moved outwards.

Figure 3:
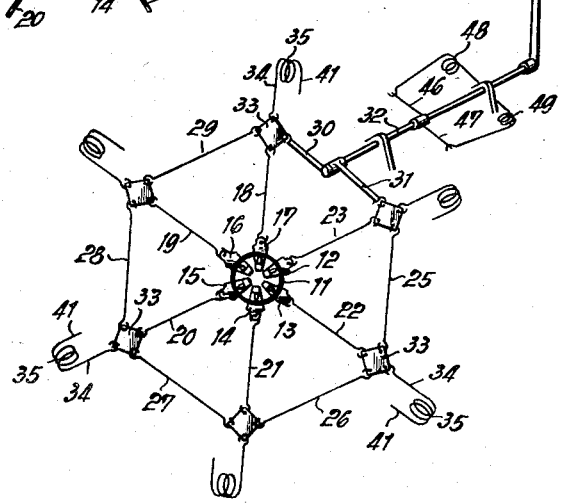
Figure 3 is the polygonal frame with indicating device.

A modification of the measuring device by which the wall thickness is measured, instead of the inner diameter, is illustrated in cross-section in Figure 4. This device again has a number of inner feelers 79 as well as outer feelers 80 which are pivotally mounted at 81 on the inner feelers. Rollers 82 are mounted on the outer feeler arms and effect, in the movement of the feeler arm towards the right when striking against the fixed roller face 83, a lifting up of the feeler arms 80 from the hollow body 11, simultaneously with an inward movement of the inner feeler arms 79 about their hinge portions 37 to the limit allowed by boss 84. Both sets of arms 79, 80 are thereby disengaged from the hollow body 11. The radial traction arms 18 to 23 in this example contact at their rearmost ends the outer feeler arms 80 and endeavor to draw these outwardly so that as soon as the roller 82 is displaced from the face 83, the feeler arm 80 contacts from the outside the hollow body 11. Since the upward fact acting upon the pivot 81 is communicated to the inner arms 79, these arms make contact from the inside with the wall of the hollow body 11. This is illustrated in Figure 4. Accordingly also in this case, as is illustrated in Figure 3, the polygonal frame 25, 29, 30, 31 has an exact determined length corresponding to the mean difference between the inner and outer diameters or the wall thickness, which is also determined through the rotation of the indicator arm 50. If the diameter of the hollow body 11 is greater than illustrated then both feeler arms 79, 80 move outwards. Since however they are parallel and of equal length and since the contact point 85 of the radial traction arms 18 to 23 lies exactly above the pivotal point 37 of the inner feeler arms, the increase of the diameter of the hollow body 11 has no noticeable influence on the measurement results. If however only the inner diameter changes, then the outer feeler 80 is forced to carry out a rotational movement about the point 81 relative to the inner feeler 79 with a corresponding effect on the polygonal frame and in consequence a noticeable alteration of the measurement result.

Experiments have shown that with the new device an extremely rapid and safe measurement of larger numbers of hollow bodies is attainable. It is moreover possible for example with a six-arm polygonal frame to measure the wall thickness of five hollow bodies per second, wherein 5×12 i. e. 60 individual measurements are used. With the former feeler or gauging devices a much greater length of time would have been used for this process and the degree of accuracy would have been smaller.

We claim:

1. A measuring device for the dimensions appertaining to a hollow body comprising a polygonal frame, a plurality of spring-controlled feelers, a cam and cam follower associated with each feeler and operative to compress the feelers for introduction to the bore of the hollow body and release them to expanded condition after introduction, a radial link connecting each feeler to a junction point of the polygonal frame, two neighboring ones of said junction points each having attached thereto a belt-like member, and an indicator arm mounted on a spring-loaded shaft on which each belt-like member is wound, winding and unwinding movement of the belt-like members effecting rotational movement of the shaft respectively in opposite directions, whereby alteration of the peripheral length of the polygonal frame is converted to angular movement of the indicator arm.

2. A measuring device for the dimensions appertaining to a hollow body comprising a polygonal frame, a plurality of spring-controlled feelers, a cam and cam follower associated with each feeler and operative to compress the feelers for introduction to the bore of the hollow body and release them to expanded condition after introduction, a radial link connecting each feeler to a junction point of the polygonal frame, said radial links being oscillatable in the circumferential direction, two neighboring junction points of the polygonal frame each having attached to it a belt-like member, and an indicator arm mounted on a spring-loaded shaft on which each belt-like member is wound, winding and unwinding movement of the belt-like members effecting rotational movement of the shaft respectively in opposite directions, whereby alteration of the peripheral length of the polygonal frame is converted to angular movement of the indicator arm.

3. A measuring device in accordance with claim 2 and including means for presenting the hollow body centrally to the feelers.

4. A measuring device for the mean inner diameter of a hollow body, comprising a hexagonal frame including six junction members with a connecting member connecting each pair of adjacent junction members with the exception of two, six spring-controlled feelers, means for maintaining said feelers assembled in circular relation, a cam and cam follower associated with each feeler and operative to compress the feelers before introduction within the hollow body and expand them after introduction, a spring controlled radial link oscillatable in the circumferential direction connecting each feeler with a junction member of the hexagonal frame, a belt connected to each of the two neighboring junction members between which a connecting member does not extend and a contact and indicator arm mounted on a spring-loaded shaft on which each of the two belts is wound, winding and unwinding movement of the belts due to changes in the peripheral length of said frame and, thereby, in the relative position of said feelers effecting rotation of the shaft respectively in opposite directions, the said winding movement acting to move the contact and indicator arm over a series of arcuately-spaced contact segments.

5. A measuring device for the mean inner diameter of a hollow body, comprising a hexagonal frame including six junction members with a connecting member connecting each pair of adjacent junction members with the exception of two, six spring-controlled feelers, means for maintaining said feelers assembled in circular relation, a cam and cam follower associated with each feeler and operative to compress the feelers before introduction within the hollow body and expand them after introduction, a spring-controlled radial link oscillatable in the circumferential direction connecting each feeler with a junction member of the hexagonal frame, a belt connected to each of the two neighboring junction members between which a connecting member does not extend, and a contact and indicator arm mounted on a spring-loaded shaft on which each of the two belts is wound, winding and unwinding movement of the belts effecting rotation of the shaft respectively in opposite directions, the said winding movement acting to move the contact and indicator arm over a seriees of arcuately spaced contact segments wherein each contact segment is included in an energizing circuit of relay operative to actuate a valve of a sorting device whereby the hollow bodies are sorted according to the mean diameter value.

6. A measuring device in accordance with claim 5 and including a gripping device for the hollow bodies having gripper arms forming part of a bell crank lever, operation of the bell-crank lever acting to open and close said gripper arms simultaneously, said gripping device presenting each hollow body centrally to the feelers.

7. A measuring device in accordance with claim 5, wherein the sorting device associated with each of said segments comprises an armature of said valve, physically adjacent ones of said valves being controlled by said relays connected to physically non-adjacent ones of said segments.

8. A measuring device for the wall thickness of a hollow body comprising a polygonal frame, a plurality of pairs of hinged inner and pivoted outer spring-controlled feelers, the outer feelers being pivotally mounted on the inner feelers, a cam and cam follower associated with each outer feeler and operative to compress the inner feelers and expand the outer feelers for introduction of the device to the hollow body and to bring said pairs of feelers into contact with the wall of the hollow body after introduction, a spring-controlled radial oscillatable link connecting each outer feeler, at a point directly above the hinge point of each inner feeler, to a junction point of the polygonal frame, each of two neighboring ones of said junction points having attached to it a belt-like member, and an indicator arm mounted on a spring-loaded shaft on which each belt-like member is wound, winding and unwinding movement of the belt-like members effecting rotational movement of the shaft respectively in opposite directions, whereby alteration of the peripheral length of the polygonal frame is converted to angular movement of the indicator arm.

9. A measuring device in accordance with claim 8 and including a gripping device for the hollow bodies having gripper arms forming part of a bell crank lever, operation of the bell crank lever acting to open and close said gripper arms simultaneously, said gripping device presenting each hollow body centrally to the feelers.

10. A measuring device for the cross section of a hollow body comprising a polygonal frame, a plurality of pairs of hinged inner and pivoted outer spring-controlled feelers, the outer feelers being pivotally mounted on the inner feelers, a cam and cam follower associated with each outer feeler and operative to compress the inner feelers and expand the outer feelers for introduction of the device to the hollow body and to bring said pairs of feelers into contact with the wall of the hollow body after introduction, a spring-controlled radial oscillatable link connecting each outer feeler, at a point between the hinge point of an inner feeler and the pivotal point of an outer feeler, to a junction point of the polygonal frame, each of two neighboring ones of said junction points having attached to it a belt-like member, and an indicator arm mounted on a spring-loaded shaft on which each belt-like member is wound, winding and unwinding movement of the belt-like members effecting rotational movement of the shaft respectively in opposite directions, whereby alteration of the peripheral length of the polygonal frame is converted to angular movement of the indicator arm.

11. A measuring device in accordance with claim 10 and including a gripping device for the hollow bodies having gripper arms forming part of a bell crank lever, operation of the bell crank lever acting to open and close said gripper arms simultaneously, said gripping device presenting each hollow body centrally to the feelers.

12. A measuring device for the dimensions of a cylindrical body comprising a plurality of circularly arranged feelers, means for maintaining said feelers assembled in said circular relation, a plurality of radial links corresponding in number to the number of said feelers with each radial link having its inner end connected to one of said feelers, a junction member connected to the outer end of each of said radial links, connecting members connecting all of adjacent junction members with the exception of two adjacent junction members between which there is an opening to form a peripheral polygonal frame, spring means in said opening tending to vary the length of said polygonal frame, an indicator member, and an operative connection between said indicator member and said polygonal frame at said opening.

13. A measuring device for the dimensions of a cylindrical body comprising a plurality of circularly arranged feelers, means for maintaining said feelers assembled in said circular relation, spring means normally tending to expand said feelers, means to compress said feelers against the influence of said spring means whereby they are adapted for insertion into the bore of a hollow body, a plurality of radial links corresponding in number to the number of said feelers with each radial link having its inner end connected to one of said feelers, a junction member connected to the outer end of each of said radial links, connecting members connecting all of adjacent junction members with the exception of two adjacent junction members between which there is an opening to form a peripheral polygonal frame, spring means in said opening tending to vary the length of said polygonal frame, an indicator member, and an operative connection between said indicator member and said polygonal frame at said opening.

14. A measuring device for the dimensions of a cylindrical body comprising a plurality of circularly arranged resilient feelers normally tending to expand at one end, means for maintaining said feelers assembled in said circular relation, a cam on each of said feelers, and cam-engaging means for compressing said feelers for insertion into a hollow body, a plurality of radial links corresponding in number to the number of said feelers with each radial link having its inner end connected to one of said feelers, a junction member connected to the outer end of each of said radial links, connecting members connecting all of adjacent junction members with the exception of two adjacent junction members between which there is an opening to form a peripheral polygonal frame, spring means in said opening tending to vary the length of said polygonal frame, an indicator member, and an operative connection between said indicator member and said polygonal frame at said opening.

References Cited in the file of this patent

UNITED STATES PATENTS 2,260,354    Wallace _____ Oct. 28, 1941